(No Model.)
A. IHLENFELDT.
GATE.
No. 473,578. Patented Apr. 26, 1892.
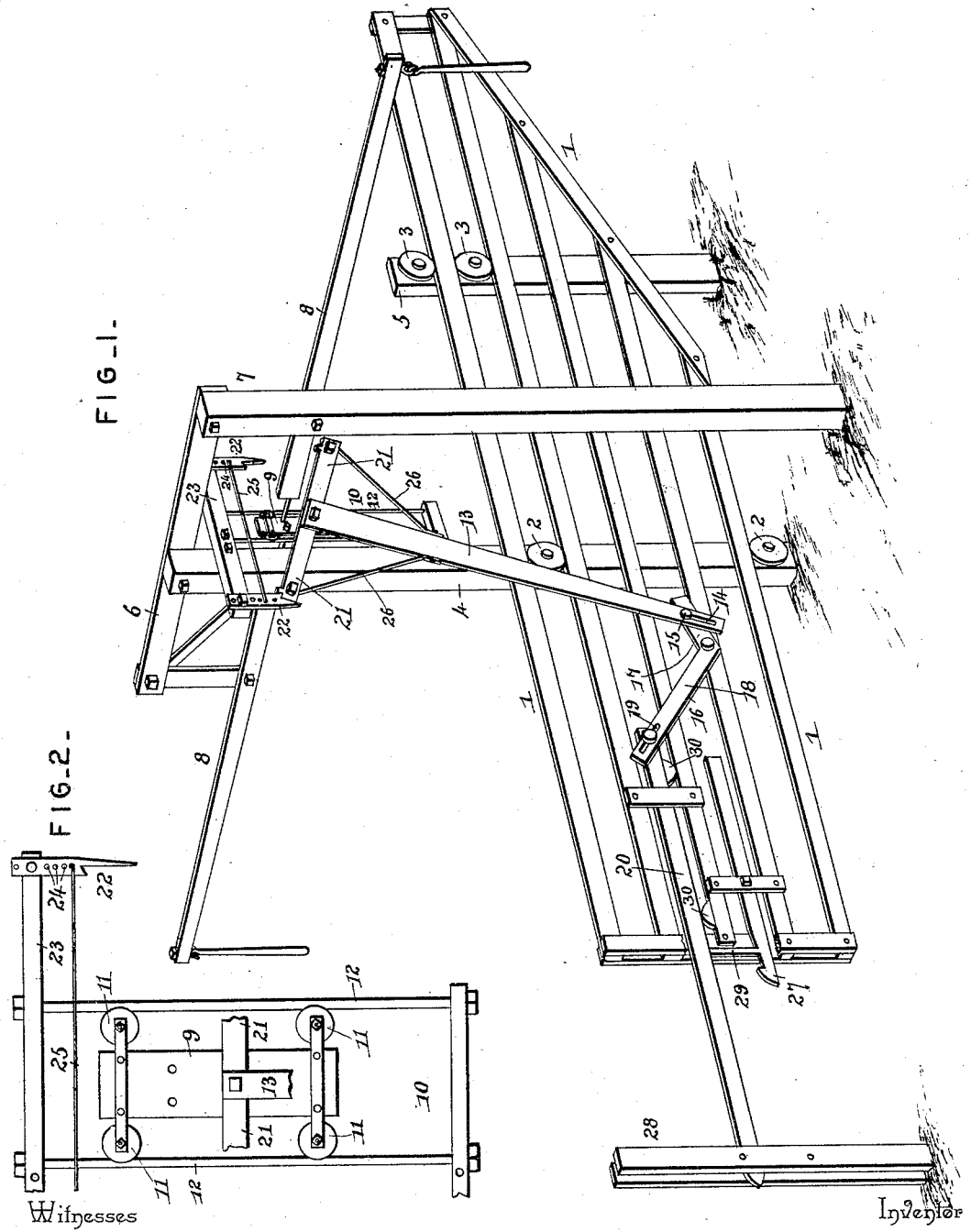
Witnesses
Jas. K. M?Cathran
N. W. Wiley
Inventor
August Ihlenfeldt
By his Attorneys,
C. A. Snow & Co.

UNITED STATES PATENT OFFICE.

AUGUST IHLENFELDT, OF BLOOMINGTON, ILLINOIS.

GATE.

SPECIFICATION forming part of Letters Patent No. 473,578, dated April 26, 1892.

Application filed June 15, 1891. Serial No. 396,401. (No model.)

*To all whom it may concern:*

Be it known that I, AUGUST IHLENFELDT, a citizen of the United States, residing at Bloomington, in the county of McLean and State of Illinois, have invented a new and useful Gate, of which the following is a specification.

The invention relates to improvements in sliding gates.

The object of the present invention is to simplify and improve the construction of sliding gates and to provide one which may be readily opened or closed by a single stroke of an operating-lever and to enable the gate to be readily employed for separating animals by providing a passage for small animals and preventing the passage of larger ones.

The invention consists in the construction and novel combination and arrangement of parts hereinafter fully described, illustrated in the accompanying drawings, and pointed out in the claims hereto appended.

In the drawings, Figure 1 is a perspective view of a sliding gate embodying the invention. Fig. 2 is a detail view of the vertically-movable plate.

Like numerals of reference indicate corresponding parts in both the figures of the drawings.

1 designates a sliding gate mounted on rollers 2 and 3 of an upright 4 and a post 5. The upright 4 has its upper end connected by a horizontal bar 6 with a similar upright 7, and these parts form a supporting-frame upon which are fulcrumed operating-levers 8, which have their inner ends connected with and adapted to actuate a vertically-movable plate 9. The vertically-movable plate 9 is arranged in a guide-frame 10 and is provided at each end with a pair of rollers 11, arranged to engage guide-rods 12 of the frame 10, whereby the plate is adapted to move vertically without friction. A T-shaped lever 13 is fulcrumed at its head on the plate 9 and is provided at its lower end with a slot 14, in which is arranged a pivot 15, which connects the T-shaped lever with one of the arms of a bell-crank lever 16. The bell-crank lever 16 is fulcrumed on one of the horizontal bars of the gate and has a short arm 17, which is connected with the T-shaped lever, and a long arm 18, which is slotted at 19 and connected with the inner end of a sliding latch-bar 20. A downward movement of one of the operating-levers raises the plate 9, which carries with it the T-shaped lever, and as the T-shaped lever nears a vertical position one of its arms 21 engages one of a pair of catches 22, which catch causes the T-shaped lever to turn on its pivot to carry the gate over without having a dead-center. The catches 22 are pivoted to and depend from an upper cross-bar 23 of the guide-frame 10 and are provided with perforations 24 and are connected by a rod 25. The arms 21 of the T-shaped lever are braced by rods 26.

The gate is provided with a pivoted gravity latch-bar 27, arranged to engage a pin between latch-posts 28. The gravity latch-bar 27 is connected by a vertical rod 29 with the sliding latch-bar 20, which merely bears upon the upper end of the vertical bar 29, and when an operating-lever is depressed to open the gate the sliding latch-bar will be moved sufficiently by the T-shaped and bell-cranked levers to depress and release the gravity latch-bar. The sliding latch-bar engages the latch-post until one of the arms of the T-shaped lever is engaged by one of the catches, when the T-shaped lever will turn the bell-crank lever and withdraw the sliding latch-bar.

The gate may be partially opened, as illustrated in the accompanying drawings, with the latch-bar 20 extending across the opening between the gate and the latch-post to enable animals to be separated by permitting the small ones to pass under it and preventing the larger ones from passing through the gateway. Segmental blocks 30 are secured to one of the horizontal bars of the gate and to the lower edge of the sliding latch-bar 20 to facilitate the operation of the latches.

The catches 22, which are provided with perforations, may be adjusted vertically on the end of the top cross-bar of the guide-frame, which cross-bar extends out considerably beyond the guide-bars. This vertical adjustment of the catches enables them to be readily arranged to engage the T-shaped lever at the proper time.

A single downward movement of one of the operating-levers opens the gate and a corresponding upward movement closes the same.

What I claim is—

1. The combination of a supporting-frame, a sliding gate, a guide-frame secured to the supporting-frame and having parallel guide-rods, a vertically-movable plate provided with rollers arranged on the guide-rods, a lever connected with the gate and vertical plate, and an operating-lever fulcrumed on the supporting-frame and having its inner end connected with the plate, substantially as described.

2. The combination of a supporting-frame, a sliding gate, a guide-frame secured to the supporting-frame and having parallel guide-rods, a vertically-movable plate provided with rollers arranged on the guide-rods, catches depending from the guide-frame, a T-shaped lever fulcrumed on the plate and connected with the gate and having its arms arranged to be engaged by the catches, and an operating-lever fulcrumed on the supporting-frame and connected with the plate, substantially as described.

3. The combination of a supporting-frame, a sliding gate located therein, catches located above the gate, a T-shaped lever having its head movably fulcrumed between the catches and having its arms arranged to engage the catches and connected at its lower end with the gate, and means for raising and lowering the T-shaped lever, substantially as described.

4. The combination of a supporting-frame, a sliding gate, a guide-frame secured to the supporting-frame and having parallel guide-rods, vertically-adjustable catches depending from the guide-frame, a rod connecting the catches, a vertically-movable plate provided with rollers arranged on the guide-rods, a T-shaped lever fulcrumed on the plate and having its arms arranged to be engaged by the catches, and an operating-lever connected with the plate, substantially as described.

5. The combination of a supporting-frame, a sliding gate, a guide-frame secured to the supporting-frame, a vertically-movable plate mounted in the guide-frame, catches depending from the guide-frame, a bell-crank lever fulcrumed on the gate, a sliding latch-bar arranged on the gate and connected to the bell-crank lever, a T-shaped lever fulcrumed on the plate and having its arms arranged to be engaged by the catches and having its lower end connected with the bell-crank lever, and an operating-lever connected with the plate, substantially as described.

AUGUST IHLENFELDT.

Witnesses:
FREMONT MILLER,
IRA F. GILMORE.